(12) United States Patent
Wisniewski et al.

(10) Patent No.: US 7,949,553 B1
(45) Date of Patent: May 24, 2011

(54) METHOD AND SYSTEM FOR A SELECTION OPTIMIZATION PROCESS

(75) Inventors: Michael Wisniewski, Kingwood, TX (US); Navin Aswal, Houston, TX (US); Maarten Oosten, Houston, TX (US); Viroj Buraparate, Kingwood, TX (US)

(73) Assignee: PROS Revenue Management, L.P., Houston, TX (US)

( * ) Notice: Subject to any disclaimer, the term of this patent is extended or adjusted under 35 U.S.C. 154(b) by 1608 days.

(21) Appl. No.: 10/670,989

(22) Filed: Sep. 25, 2003

(51) Int. Cl.
*G06F 9/44* (2006.01)

(52) U.S. Cl. ............... 705/7.33; 705/14.49; 705/14.51; 705/14.52

(58) Field of Classification Search ............... None
See application file for complete search history.

(56) References Cited

U.S. PATENT DOCUMENTS

| | | | | |
|---|---|---|---|---|
| 5,754,938 A * | 5/1998 | Herz et al. | | 725/116 |
| 5,754,939 A * | 5/1998 | Herz et al. | | 455/3.04 |
| 6,029,195 A * | 2/2000 | Herz | | 725/116 |
| 6,067,525 A * | 5/2000 | Johnson et al. | | 705/10 |
| 6,115,693 A * | 9/2000 | McDonough et al. | | 705/10 |
| 6,895,405 B1 * | 5/2005 | Choi et al. | | 705/10 |
| 6,993,494 B1 * | 1/2006 | Boushy et al. | | 705/10 |
| 7,058,590 B2 * | 6/2006 | Shan | | 705/10 |
| 7,072,848 B2 * | 7/2006 | Boyd et al. | | 705/10 |
| 7,437,323 B1 * | 10/2008 | Valkov et al. | | 705/36 R |
| 7,548,915 B2 * | 6/2009 | Ramer et al. | | 1/1 |
| 2001/0014868 A1 * | 8/2001 | Herz et al. | | 705/10 |
| 2002/0123930 A1 * | 9/2002 | Boyd et al. | | 705/14 |
| 2002/0165755 A1 * | 11/2002 | Kitts | | 705/10 |
| 2002/0169654 A1 * | 11/2002 | Santos et al. | | 705/10 |
| 2003/0028451 A1 * | 2/2003 | Ananian | | 705/27 |
| 2003/0033179 A1 * | 2/2003 | Katz et al. | | 705/7 |
| 2003/0033193 A1 * | 2/2003 | Holloway et al. | | 705/10 |
| 2003/0208754 A1 * | 11/2003 | Sridhar et al. | | 725/34 |
| 2003/0220860 A1 * | 11/2003 | Heytens et al. | | 705/35 |
| 2004/0078260 A1 * | 4/2004 | Milgramm et al. | | 705/10 |

OTHER PUBLICATIONS

Terrence V. O'Brien et al., "Marketing information systems for consumer products companies," J. Consumer Marketing, vol. 12, iss. 5, p. 16 (1995).*
Vicki G. Morwitz & David C. Schmittlein, "Testing New Direct Marketing Offerings," Management Science, vol. 44, No. 5, p. 610 (May 1998).*
David C. Schmittlein & Robert A. Peterson, "Customer Base Analysis," Marketing Science, vol. 13, No. 1, p. 41 (Winter 1994).*

* cited by examiner

*Primary Examiner* — Romain Jeanty
*Assistant Examiner* — Brett Feeney
(74) *Attorney, Agent, or Firm* — Crowell & Moring LLP

(57) ABSTRACT

Systems and methods are described which optimize a business process through adaptive learning. Incoming customers are profiled and based on the customer's profile, a corresponding set of actions may be generated. From this set of actions, an algorithm is used to select a discrete action which is then presented to the customer. The customer's response to the presented action may in turn be used to forecast future customer responses and update the selection algorithm. These methods and systems allow attainment of a specific objective through progressive optimization of a business process.

17 Claims, 4 Drawing Sheets

| Profile | Actions | | | | | |
|---|---|---|---|---|---|---|
| | A | B | C | D | E | F |
| I | $2000**/$300*** | $3000/$600 | 0 | 0 | $5000/$1000 | 0 |
| II | $2500/$200 | $2800/$300 | $2900/$300 | $4000/$2000 | $3000/$150 | $2500/$500 |
| III* | $1000/$100 | $6000/$900 | $10000/$1000 | 0 | 0 | $2000/$300 |
| IV | $650/$300 | $800/$400 | $6000/$2000 | 0 | $2500/$500 | 0 |
| V | $2700/$100 | $2900/$200 | $2800/$200 | 0 | 0 | 0 |

* the repeat visitor with family profile  average revenue in dollars  *standard deviation in dollars

FIG. 4

METHOD AND SYSTEM FOR A SELECTION OPTIMIZATION PROCESS

TECHNICAL FIELD OF THE INVENTION

The present invention relates generally to optimizing business processes, and more particularly to optimizing business processes through adaptive learning based on situational responses.

BACKGROUND OF THE INVENTION

Pricing optimization is an operations research technique that focuses on setting prices for goods or services in a manner that optimizes an objective such as maximizing profit through, for example, contracting the supply or manipulating the price. Companies can employ pricing optimization to match prices and offers to subsets of customers having identifiable differences, such as differences in needs, amounts needed, or willingness to pay. This allows the seller to sell its goods or services with a total market return that is higher than if prices were not adaptively set to exploit such differences or heterogeneity of demand.

Often times the objective of pricing optimization is the optimization of a specific business objective, such as maximizing net income or profit. Ideally, this maximization function would be approached asymptotically through modification of a business process employing successive iterations of a stimulus-response or trial and error cycle. For example, a product might be placed in the market with a certain price. In order to discern which price point maximizes revenue, the price may be varied and the results observed. This is the approach taken by many prior art approaches to optimizing certain business objectives.

The problem with this approach, however, is that it allows observation of only very simplistic stimuli. In the price example above, only one price may be attached to a particular product and the response to that particular price observed at any particular moment. Thus, the response to the particular price is a discrete one, either a customer buys a product at a certain price point or they do not. The discrete response nature of these prior art methods allow only a discrete set of success-failure responses to be observed.

In the real world, however, the stimuli that drive certain actions may be fairly complicated. But placing a multi faceted stimulus in the market presents its own set of problems. Namely, when a multi faceted stimulus is utilized is it not necessarily directly observable which aspect of the stimulus is generating the corresponding response. Furthermore, the response may not be a simple acceptance-rejection of the stimulus but rather the acceptance may occur on a continuum, e.g. a quantity purchased or a total amount of revenue committed.

SUMMARY OF THE INVENTION

Systems and methods for the optimization of a process are disclosed. These methods and systems use adaptive learning to successively refine a process based upon actual customer responses. An incoming customer may be matched to a profile, this profile can then be used to identify a set of actions, and an action may be selected from this set and presented to the customer. The customer's response to the presented action can then be received and utilized in selecting actions and forecasting future customer responses.

In some embodiments, a customer may be matched to a profile using external information.

In another embodiment, an algorithm may be used to select an action to present to the customer from a set of actions.

In yet other embodiments, this algorithm uses historical data in the selection of an action to present to the customer.

In another set of embodiments, a response forecast is generated for all profiles.

In other similar embodiments, the response forecast is updated using a customer's response to a presented action. This updating may apply both to the forecast for the profile to which the customer was assigned as well as to other profiles. That is, the forecasting may use information across profiles rather than solely within each profile.

In some embodiments, the response forecast is used to update the selection algorithm.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

FIG. 4 is a table representing one example of action-profile pairs and their commensurate responses.

DESCRIPTION OF PREFERRED EMBODIMENTS

Figure 1:
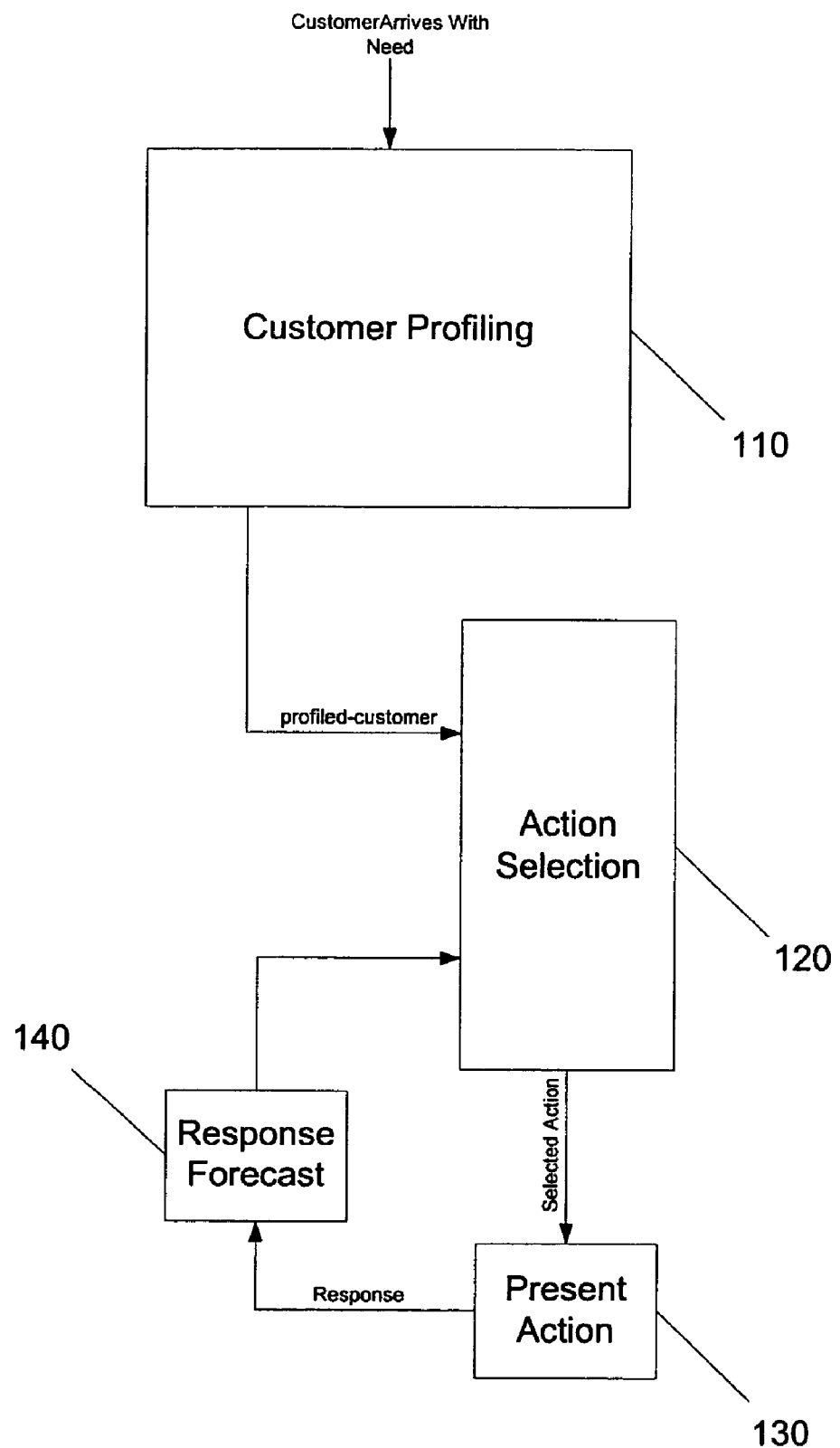
FIG. 1 is a block diagram of an embodiment of a method for successive refinement of a business process.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

A few terms are defined or clarified to aid in understanding the descriptions that follow. A customer may be understood in the context of this disclosure not only as someone who approaches in a business context, but additionally an entity or group whose response is to be gauged, evaluated, or optimized.

An action is a unique treatment or stimulus from a set of alternatives applicable to a specific context. For example, in a sales-related call center, an action might be a specific agent "script" defined by a specific combination of questions, answers, and special offers. One alternative action might possess the exact same questions, answers, and special offers as another action but in a different order thus being a distinct, alternative action. Alternatively, it might have the same ordering of questions, and answers, but differ in the set of special offers, etc.

In the context of contracting, actions may be contracts. For example, a contract may take the form of a "discounted price list" where the customer is not contractually bound in terms of the revenue or unit volume of business committed to the seller. The seller has several alternative price lists (actions) that may be presented to a profiled customer. Each price list may ultimately yield a different outcome, e.g., some amount of annual revenues realized from the customer. The price lists might vary in terms such as: (1) the set of offered items (products, product-bundles, or services), (2) the associated, effective prices, or (3) miscellaneous sales terms and conditions, e.g., ancillary service charges, special fees, payment terms, etc. Thus, any one action could be unique from the others.

In the context of website content management, an action might be a distinct presentation of web page content. For example, consumers with a travel need may arrive at a website and begin traversing the site. During this process the user may be exposed to one of several alternative web-offers. Here, the substantive difference amongst actions may be the combination of offers, the pricing, differences in the presentation, or other aspects which the business operating the website desires to test or optimize. The above illustrations are meant only to facilitate an understanding of the term action, and should in no way be construed to limit the meaning of that term in any way.

A profile is meant to connote a more generalized form of customer segment. A customer segment might typically be defined by a set of customer attributes, and may be any aggregation that allows more effective operation of a business. A profile might be defined both by a set of customer attributes and by the need at hand and possibly, the business context. For example, a profile might be defined by a customer attribute of income-range (e.g., $40,000 to $60,000 in income per year), a need (e.g., interest in vacation packages ranging from $2,000 to $5,000), and a context variable of sales channel (e.g., a phone call to a special 1-800 number corresponding to an advertised special vacation offer).

Attention is now directed to systems and methods for optimizing a business process through adaptive learning. These systems and methods may be used to refine the process which determines what actions a seller of a product should take when approached by a potential customer by analyzing the customer's responses to various stimuli. Additionally, these systems and methods can utilize customer profiles to select an appropriate action to take when approached by a customer fitting certain criteria. The customer's response to the action can then be measured, and the results used in refining the successive actions presented to customers.

Although exemplary embodiments of the systems and methods presented are utilized throughout in the context of travel related call centers, contracting, and website presentation management, it will be understood by those of ordinary skill in the art that these same systems can be applied to a myriad number of varied processes.

Before discussing the intricacies of embodiments of the present invention, an overview of the methods and systems discussed is presented. FIG. 1 depicts embodiments of methods and systems for optimizing a business process through the use of adaptive learning. Typically, a customer approaches a seller or a business with a certain need. At step 110 an incoming customer may be assigned to one of a set of defined profiles. After the customer is profiled (STEP 110), an algorithm can be used to select an action from a set of actions associated with the profile (STEP 120). At step 130 the selected action may be presented to the customer. The response to the selected action may be received and used to update a forecast of a future customer's response to an action (STEP 140). This response forecast may then be used to update the algorithm which selects an action to present to the customer (STEP 120).

In many cases, the initial profiles, actions and selection algorithms may be pre-defined. The iterative process of successive refinement of a business process through adaptive learning may be given initial starting conditions by providing a defined set of customer profiles and grouping mechanism. Additionally, initial action sets corresponding to the customer profiles may be given, along with an algorithm for selecting which action to present to the customer.

Figure 2:
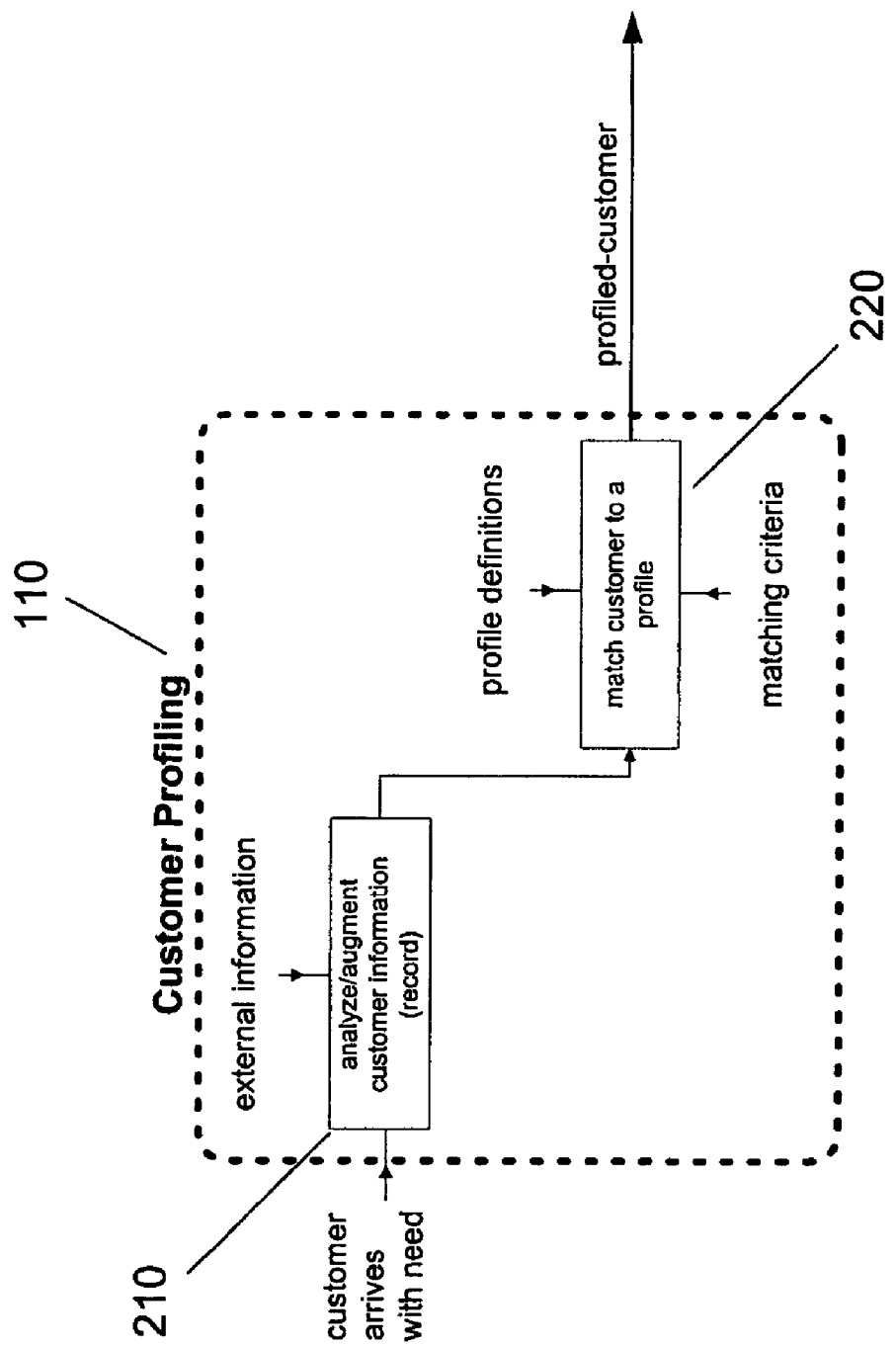
FIG. 2 is a block diagram for one method of profiling a customer.

FIG. 2 depicts in more detail the profiling of an incoming customer (STEP 110). During customer profiling (STEP 110) information pertaining to an incoming customer may be analyzed and augmented (STEP 210). This analysis (STEP 210) allows the customer to be matched to a profile (STEP 220).

At step 210 information about the incoming customer, such as income, or need is analyzed. In many instances, the immediately available information from an incoming customer may be incomplete and thus analyzing customer information (STEP 210) may include augmenting the information acquired on a particular customer and adding this newly acquired information to previously collected customer information or a customer record (STEP 210). Augmenting customer information may be accomplished by obtaining customer attributes from an external source such as a database kept by a third party, a credit reporting bureau, or possibly the customer's website.

After the customer information is augmented and analyzed (STEP 210) the resulting customer information or record can then be matched to a certain profile (STEP 220). In many embodiments, this matching (STEP 220) may be accomplished by taking various profile definitions and matching criteria, and comparing them to customer information and attributes. Attributes such as income, interests, needs, age and the like may be used to match a customer to a profile (STEP 220). Additionally, in cases where information on a customer is scant, even after such information is augmented, matching the customer record to a profile (STEP 220) may also include utilization of statistical algorithms to select a profile which most closely resembles the customer. Based upon the match made at step 220, a simple profile identifier (e.g., a profile number) may in turn be assigned to a customer.

In a travel related call center, a customer may be profiled (STEP 110) in the following manner. The customer arrives with a vaguely defined need or interest in a family vacation package at a specific amusement park. The agent retrieves or initializes a customer record completing some profile information from the call directly, with additional information retrieved from historic customer databases, e.g., data of past interactions, inquiries, or transactions. The customer record shows the caller has been visiting this park every year for the last three years. With this information, the customer may be matched with a specific profile, e.g., a "repeat-visitor-with-family" profile.

A customer in a contract scenario may also be profiled (STEP 110). A salesperson and customer meet to establish a one-year price list contract for the coming year. The salesperson assesses the customer's needs in terms of the expected set of products that will be purchased, the corresponding volumes, and factors such as expected order sizes, financial viability of the customer, etc. Based on this information and possibly external, augmented information, the customer may be assigned to a specific profile, e.g., a "new customer-small business-high growth potential-small product set" profile.

Customer profiling (STEP 110) may be particularly useful in web site content management. A visitor to the travel-related website may log-in to the web site, and through this login ID and click stream activity may generate raw attributes with which he is to be profiled. Alternatively, under no login, the profiling may be based purely on the user's clickstream and the matching of this clickstream with established profiles. Here, profiles would be defined in terms of clickstreams attributes, e.g., relating to the content visited, the series of web-pages visited, etc. The customer may be assigned, for example, to a "leisure-last minute-cruise" traveler profile.

Figure 3:
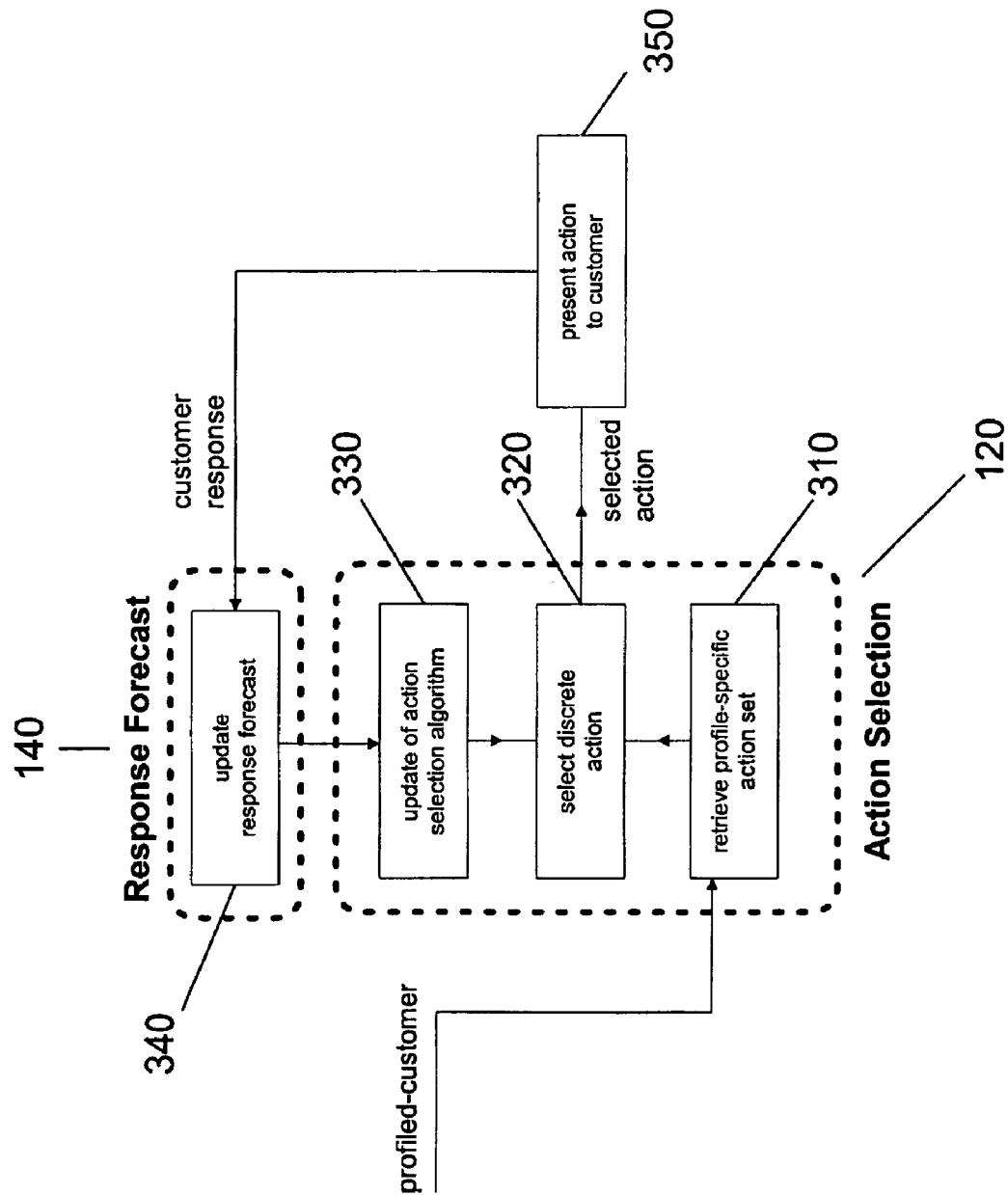
FIG. 3 is a block diagram for one method of forecasting a response to a set of actions and presenting an action to a customer.

Returning briefly to FIG. 1, after a customer is profiled (STEP 110), an appropriate action may be selected for that customer (STEP 120). FIG. 3 depicts the intricacies of selecting an appropriate action to present to a customer (STEP 120). Based upon the profile assigned to a customer (STEP 110) a specific action set associated with that profile may be retrieved (STEP 310). An action selection algorithm may then select a discrete action from the profile specific action set (STEP 320) which is then presented to the customer (STEP 350). The customer's response to the selected action may then be used to update a response forecast (STEP 340) and the response forecast in turn used to dynamically update the action selection algorithm (STEP 330).

To select a proper action to present to the customer (STEP 120) a profile specific action set which matches the customer's profile is retrieved (STEP 310). These profile specific action sets may be culled from a set of actions considered universally acceptable to present to a customer irrespective of a particular context or profile, or the set of actions may be a subset of actions acceptable only for that particular profile. In many instances, the profile specific set of actions retrieved (STEP 310) consists of a specific group of action selected from a universal set of actions based upon anticipated customer response, and may be defined initially using prior data or response forecasting.

At step 320 a selection algorithm may select a discrete action from the profile specific action set to present to the customer. The selection algorithm is typically based on an optimization considering both business objectives and the set of forecasted response distributions for the actions. For example, one might maximize revenue across a set of actions for a profile subject to the uncertainty (variability) of revenue that each action may generate. As more profiled customers are presented with the actions (STEP 350), the selection algorithm may accrue greater confidence in the distributional form and expected revenue of each action and thus would trend toward selecting the action that has higher expected revenue. Furthermore, if the market response is changing over time or over successive customer arrivals, the selection algorithm can detect such trending and adapt to it.

The selection algorithm may be based solely on the response distributions or on both response distributions and other business inputs. For example, the selection algorithm may aim to maximize profit (being revenue minus cost) subject to the uncertainties of the revenue payoff of each action (the revenue distributions) where costs vary with successive profiled customers. In this example, the varying costs may also be used in updating the selection algorithm (STEP 330). Thus, the central aspect of the selection algorithm is that dynamically updated response distributions are used in the action selection for learning and reduction of uncertainty, not that any specific optimization algorithm is necessarily utilized. The formulation of such selection algorithms will be obvious to those of ordinary skill in the art.

Because distributions may be used to measure response to a selected action, a selection algorithm can be formulated to achieve two key aims:
1. accruing a quantifiable understanding of market response to the set of actions, and
2. optimizing a business objective such as maximizing revenue.

These aims may be elucidated more clearly: firstly, embodiments of the present invention have an inherent test and control capability. The seller can establish several actions that he believes are very similar in terms of the customer distributional response they will generate. He may also initialize the process with response distributions that are the same (or similar) for the actions. Then, as the process is iterated the distributions are updated regularly to more closely reflect the true response distributions for the actions selected (STEP 320). Thus, the seller may experiment in the market by defining a specific set of actions—some being test actions and others serving as controls. After running the process for a series of customers, the seller can assess which actions are most effective for the profile.

Separate from the first aim, embodiments of the present invention allow the seller to select actions (STEP 320) on an ongoing basis in a business context where the best actions to recommend are not obvious, either per customer or across a stream of customers. As noted, this uncertainty may arise from the fact that customer response is imprecise (i.e. represented by distributions) or that other business factors are changing on an ongoing basis, e.g., the costs of a product being sold.

A discrete action may be selected (STEP 320) in a travel related call center. For profile 1, agent scripts A, B and C are established. Script A is an existing, standard script used by all agents. Script B and C are test scripts. The seller is aiming to identify which script yields the best average revenue per customer in profile 1. The process is initialized with naive revenue distributions for each action based on the seller's best intuition of the market and the process is started. The selection algorithm is set to be updated (STEP 330) after each 100 customers of profile 1 are processed. After some time, the seller can inspect the revenue distributions and identify which action has the highest average revenue.

Actions may also be selected (STEP 320) in a contracting context. The seller establishes 3 price lists (denoted A, B and C) as competing actions for profile 1. Similarly, the seller establishes competing price lists (actions) for other profiles. The seller desires to maximize revenue of his business, but it is also important to minimize the chance of losing any one customer to the competition. Using the process, the seller desires to assign each customer to a profile where actions (price lists) are: (1) below the customer's willingness to pay thus getting the customer to spend with the seller versus opting to divert all business to the competition, but (2) not any lower than necessary to win the majority of the customer's business, i.e., to maximize revenue. Thus, embodiments of the present invention may be applied and the selection algorithm used to select an appropriate action (STEP 320).

For website content management actions may be selected (STEP 320) as follows. The website provider (e.g., cruise line operator) constructs 5 alternative actions which present differing sets of free amenities to augment a set of last minute cruise offers. While the set of offers is the same for all 5 actions, the amenities, order of presentation, etc. may differ. The provider aims to maximize the average profit per user for each profile. Applying embodiments of the invention over time allows the provider to know which profiles respond to which amenities, which order of presentation, etc.

After an appropriate action is selected (STEP 320) and presented to a customer (STEP 350), the customer's response to the presented action can be utilized to forecast future responses to presented actions (STEP 340), and these response forecasts can in turn be utilized to update the action selection algorithm (STEP 330).

The response forecast for a profile and its corresponding set of actions usually quantifies how a new, profiled customer is expected to react when exposed to a selected action. A response forecast may consist of any type or combination of data regarding past, present, or future customer responses, or projections of anticipated customer responses. This response forecast will typically be represented as a probability distribution of customer revenue or profit. Embodiments of the present invention, however, can also be applied using a variety of other response measures such as customer satisfaction, success rate, usage volume, etc. Most often, the response measure or forecast is defined and represented in terms of a distribution. The response distribution may be based on the history of responses from prior customers in the profile-action pair, and may be updated using a customer's response to a presented action (STEP 340). Additionally, the response forecast may also allow for the definition of a starting estimate of this distribution when no historic data exists. It will be obvious to those of ordinary skill in the art how such estimates, distributions, and forecasts are to be calculated.

For a travel related call center, response forecasting may function as follows. The customer assigned to the "repeat-visitor-with-family" profile is presented with action "A" being a specific call center script including a set of vacation packages to be offered to the customer. The revenue from each package represents a discrete response value, and thus the probability distribution is defined for a set of discrete values, e.g., having a 0.4 chance of $2,000 being spent, a 0.2 chance of $3,000 being spent, etc.

FIG. 4 embodies the above example in table form, showing example means and standard deviations of revenue generated for each action/profile pair across a set of profiles. The "repeat-visitor-with-family" profile (Profile III 410) has associated values for actions {A, B, C, F}. These values may be obtained either from historic transactions or from starting estimates provided to the module.

In a contracting context, response forecasting may be utilized as well. The customer assigned to the "new customer-small business-high growth potential-small product set" profile is presented with action "A" being a specific discounted price list. The response in this case is a continuous variable—being the revenues the customer will spend under the price list (contract) for the coming year.

Response forecasting may also be used in website content management. The customer assigned to the "leisure-last minute-cruise" traveler profile is presented with action "A" being the series of last-minute offers available with a free cruise cabin upgrade on each offer. Action "B" and other actions not exposed to the visitor hold the same last minute offers but with different free amenity incentives. Here, the cruise operator or website operator knows both prices and underlying costs and so the continuous variable is profit. The response in this case can be used to measure response to the free amenities, and forecast future responses to these amenities.

After the response forecast is updated (STEP 340), the response forecast can in turn be used to update the action selection algorithm (STEP 330). The selection algorithm may be updated and applied (STEP 330) either per customer, in a batchwise (intermittent) manner, or in some amalgam of the two. For updating per customer, the response forecast may be updated (STEP 340) for each profiled customer in the process and the action selection algorithm updated (STEP 330) prior to processing the next profiled customer.

At the other extreme, the selection algorithm may generate a vector of proportions which would define how an upcoming stream of profiled customers are to be allocated across the set of actions. For example, for 3 actions corresponding to a profile 310, the selection algorithm might generate a vector of [0.2 0.2 0.6]. Then, for the next 100 customers assigned to the profile, the module would randomly allocate customers according to the proportions across actions 1, 2, and 3, i.e. 20% to action 1, 20% to action 2, etc. The response forecast and the selection algorithm would then be updated (STEPS 340, 330) after the 100 customers were processed.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A computer-implemented method for the optimization of a process, comprising:
  providing a system comprising:
    an action selection computer, comprising:
      a storage medium for storing an action database containing a set of offers and an action selection module; and
      a first processor; and
    a customer profiling computer comprising:
      a storage medium containing a customer profile database and a customer profiling module comprising at least one customer profiling algorithm; and
      a second processor for executing the at least one customer profiling algorithm;
  receiving, by the customer profiling module on the customer profiling computer, information about a customer and a customer need;
  matching, by the customer profiling module on the customer profiling computer, the information about the customer to a profile stored in the customer profile database based on the customer information;

selecting, by the action selection module on the action selection computer using an action selection algorithm, an offer from a set of offers associated with the profile, wherein each offer in the set offers is unique, wherein the set of offers comprises a plurality of alternative offers associated with the customer need and a business context;

presenting, by the action selection module on the action selection computer, the offer to the customer associated with the profile;

receiving, by the action selection module on the action selection computer, a response to the offer from the customer, storing the response in the action database in the action selection computer;

repeating the selecting, presenting, receiving and storing steps for the customer and each of a plurality of customers, wherein an order of selection and presentation of offers differs between the plurality of customers;

determining a distribution of customer responses to the set of offers;

analyzing, by the action selection module, the distribution of responses to all offers of the set of offers presented to the customers associated with the profile, wherein the analysis identifies an order of selection and presentation of offers of the set of offers that best fits the customer need and the business context for a given profile; and updating, by the action selection module, a selection and presentation order of offers of the set of offers in the action database based on the analysis of the distribution of responses, wherein future offers presented to customers associated with the profile are selected by the action selection module from the updated action database based on the analysis, wherein the order of selection and presentation of offers is an action and different orders of selection and presentation of offers are different actions, wherein actions selected for the customer and each of a plurality of customers is determined by updating a response forecast and updating the action selection algorithm by one of:

updating the response forecast and then updating the action selection algorithm according to the updated response forecast wherein the updated action selection algorithm is applied intermittently by one of: a per customer basis, a batchwise basis or in an amalgam of the per customer basis and the batchwise basis; or updating the response forecast and updating the action selection algorithm by generating a n-tuple vector of proportions, where n defines the number of actions, wherein the n-tuple vector of proportions defines how a stream of profiled customers are to be allocated across the set of actions, randomly allocating customers according to the n-tuple vector of proportions and then iteratively updating the action selection algorithm and the response forecast according to the responses to the set of actions by the stream of profiled customers.

2. The method of claim 1, wherein matching the information about the customer to a profile further comprises collecting historical information.

3. The method of claim 2, wherein receiving information about a customer further comprises augmenting the information with information received from external sources.

4. The method of claim 1, wherein the set of offers is specific to the profile, wherein each offer in the set of offers is selected based on a response forecast, and wherein a response to the offer presented to the customer is used to update the set of offers contained in the response forecast.

5. The method of claim 4, wherein the action database contains a history of responses for each offer, wherein the action selection module analyzes the history of responses associated with the profile in selecting an offer from the set of offers.

6. A system for the optimization of a process, comprising:
a customer profiling computer comprising:
a first processor;
a non-transitory machine readable media storing a customer profile database containing instructions that when executed by the processor configure the customer profiling computer to:
receive information about a customer and a customer need;
match the information about the customer to a profile stored in the customer profile database based on the customer information and one or more of a customer need and a business context; and
an action selection computer comprising:
a second processor; and
a second non-transitory machine readable media storing an action database containing a set of offers and a set of instructions that when executed by the second processor configure the action selection computer to:
select, using an action selection algorithm, an offer from a set of offers associated with the profile, wherein each offer in the set offers is unique, wherein the set of offers comprises a plurality of alternative offers associated with the customer need and a business context;
present the offer to the customer associated with the profile;
receive a response to the offer from the customer,
store the response in the action database in the action selection computer; and
repeat the select, present, receive and store steps for the customer and each of a plurality of customers, wherein an order of selection and presentation of offers differs between the plurality of customers;
determine, by the action selection computer, a distribution of customer responses to the set of offers;
analyze, by the action selection computer, the distribution of responses to all offers of the set of offers presented to the customers associated with the profile, wherein the analysis identifies an order of selection and presentation of offers of the set of offers that best fits the customer need and the business context for a given profile; and
update, by the action selection computer, a selection and presentation order of offers of the set of offers in the action database based on the analysis of the distribution of responses, wherein future offers presented to customers associated with the profile are selected by the action selection module from the updated action database based on the analysis,
wherein the order of selection and presentation of offers is an action and different orders of selection and presentation of offers are different actions, wherein actions selected for the customer and each of a plurality of customers is determined by updating a response forecast and updating the action selection algorithm by one of:
updating the response forecast and then updating the action selection algorithm according to the updated response forecast wherein the updated action selection algorithm is applied intermittently by one of: a per customer basis, a batchwise basis or in an amalgam of the per customer basis and the batchwise basis; or updating the response forecast and updating the action selection algorithm by generating a n-tuple vector of proportions, where n defines the number of actions, wherein the n-tuple vector of proportions defines how a stream of profiled customers are to be allocated across the set of actions, randomly allocating customers according to the n-tuple vector of proportions and then iteratively updating the action selection algorithm and the response forecast according to the responses to the set of actions by the stream of profiled customers.

7. The system of claim 6, wherein the set of offers is specific to the profile, wherein each offer in the set of offers is selected based on a response forecast, and wherein a response to the offer presented to the customer is used to update the set of offers contained in the response forecast.

8. A system for the optimization of a process, comprising:
a customer profiling computer comprising:
  a first processor;
  a non-transitory machine readable media storing a customer profile database and a customer profiling module that include a set of instructions that when executed by the processor configure the customer profiling computer to perform:
  receiving, by the customer profiling module, information about a customer and a customer need;
  matching the information about the customer to a profile stored in the customer profile database based on the customer information and one or more of a customer need and a business context; and
an action selection computer comprising:
  a second processor; and
  a second non-transitory machine readable media storing an action database containing a set of offers; and an action selection module that include a set of instructions that when executed by the second processor configure the action selection computer to perform:
  identifying a set of offers to be presented to a plurality of customers based on the profile associated with the plurality of customers, wherein each offer in the set of offers is unique, wherein the set of offers comprises a plurality of alternative offers associated with the customer need and a business context;
selecting, using an action selection algorithm, an offer from a set of offers;
presenting, by the action selection computer, the offer to the customer associated with the profile;
receiving a response to the offer from the customer,
storing the response in the action database in the action selection computer; and
repeating the selecting, presenting, receiving and storing steps for the customer and each of a plurality of customers, wherein an order of selection and presentation of offers differs between the plurality of customers;
determining a distribution of customer responses to the set of offers;
on the action selection computer, analyzing the distribution of responses to all offers of the set of offers presented to the customers associated with the profile, wherein the analysis identifies an order of selection and presentation of offers of the set of offers that best fits the customer need and the business context for a given profile; and updating, by the action selection computer, a selection and presentation order of offers of the set of offers in the action database based on the analysis of the distribution of responses, wherein future offers presented to customers associated with the profile are selected by the action selection module from the updated action database based on the analysis,
wherein the order of selection and presentation of offers is an action and different orders of selection and presentation of offers are different actions, wherein actions selected for the customer and each of a plurality of customers is determined by updating a response forecast and updating the action selection algorithm by one of:
updating the response forecast and then updating the action selection algorithm according to the updated response forecast wherein the updated action selection algorithm is applied intermittently by one of: a per customer basis, a batchwise basis or in an amalgam of the per customer basis and the batchwise basis; or
updating the response forecast and updating the action selection algorithm by generating a n-tuple vector of proportions, where n defines the number of actions, wherein the n-tuple vector of proportions defines how a stream of profiled customers are to be allocated across the set of actions, randomly allocating customers according to the n-tuple vector of proportions and then iteratively updating the action selection algorithm and the response forecast according to the responses to the set of actions by the stream of profiled customers.

9. The set of instructions of claim 8, wherein the set of offers is specific to the profile, wherein each offer in the set of offers is selected based on a response forecast, and wherein a response to the offer presented to the customer is used to update the set of offers contained in the response forecast.

10. The method of claim 1, wherein the business context is to maximize profit.

11. The method of claim 1, wherein the business context is to maximize revenue.

12. The method of claim 1, wherein the offer presented to a customer is selected from the set of offers based on the price, wherein the price is below the customer's willingness to pay.

13. The method of claim 8, wherein the business context is to maximize profit.

14. The method of claim 8, wherein the business context is to maximize revenue.

15. The method of claim 8, wherein a set of offers comprises a set of amenities, wherein each offer contains one or more amenities, wherein the distribution of responses is analyzed to determine which one or more amenities maximizes profit.

16. The method of claim 8, wherein a set of offers comprises a set of amenities, wherein each offer contains one or more amenities, wherein the distribution of responses is analyzed to determine which one or more amenities maximizes revenue.

17. A method comprising:
receiving, by a processor, a set of action for a first customer profile, each action in the set of action including a plurality of offers and a plurality of free amenities corresponding to each of the plurality of offers and an order of presentation of the plurality of offers differs for each action;
receiving, by the processor, a business context;

receiving, by the processor, information about a plurality of customers and needs of the plurality of customers;

determining, by the processor, that the plurality of customers match the first customer profile;

selecting, by the processor, an action from the set of actions for the first customer profile for presentation to each of the plurality of customers wherein the order of selection and presentation of offers is an action and different orders of selection and presentation of offers are different actions, wherein actions selected for the customer and each of a plurality of customers is determined by updating a response forecast and updating the action selection algorithm by updating the response forecast and updating the action selection algorithm by generating a n-tuple vector of proportions, where n defines the number of actions, wherein the n-tuple vector of proportions defines how a stream of profiled customers are to be allocated across the set of actions, randomly allocating customers according to the n-tuple vector of proportions and then iteratively updating the action selection algorithm and the response forecast according to the responses to the set of actions by the stream of profiled customers;

determining, by the processor, a distribution of responses from each of the plurality of customers to the presented action in the set of actions; and identifying, by the processor, based on the distribution of responses and accounting for the vector of proportions, an action from the set of actions that best fits the customer need and business context for the first customer profile.

* * * * *